United States Patent
Chu et al.

(10) Patent No.: US 11,153,254 B2
(45) Date of Patent: Oct. 19, 2021

(54) MEME INTELLIGENT CONVERSION

(71) Applicant: International Business Machines Corporation, Armonk, NY (US)

(72) Inventors: Zheng Ping A C Chu, Shanghai (CN); Yuan Jin, Shanghai (CN); Xi Xi Liu, Shanghai (CN); Xin Peng Liu, Beijing (CN); Fan Xiao Xin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/859,986

(22) Filed: Jan. 2, 2018

(65) Prior Publication Data

US 2019/0207901 A1 Jul. 4, 2019

(51) Int. Cl.

| | |
|---|---|
| *H04L 29/08* | (2006.01) |
| *H04L 12/58* | (2006.01) |
| *G06N 5/02* | (2006.01) |
| *G06T 11/60* | (2006.01) |
| *G06F 40/30* | (2020.01) |
| *G06F 40/205* | (2020.01) |
| *G06F 40/253* | (2020.01) |
| *G06F 40/40* | (2020.01) |

(52) U.S. Cl.
CPC ........... *H04L 51/32* (2013.01); *G06F 40/205* (2020.01); *G06F 40/253* (2020.01); *G06F 40/30* (2020.01); *G06N 5/02* (2013.01); *G06T 11/60* (2013.01); *H04L 67/306* (2013.01); *G06F 40/40* (2020.01)

(58) Field of Classification Search
CPC ......... H04L 51/32; H04L 67/306; G06N 5/02; G06F 17/2705; G06F 17/274; G06F 17/2785; G06F 40/205; G06F 40/253; G06F 40/30; G06F 40/40; G06T 11/60

USPC ........................................................ 709/206
See application file for complete search history.

(56) References Cited

U.S. PATENT DOCUMENTS

| | | | | |
|---|---|---|---|---|
| 6,966,028 | B1 * | 11/2005 | Beebe ................. | G06F 16/958 715/205 |
| 7,996,417 | B2 * | 8/2011 | Travieso ............... | G06F 40/205 707/761 |
| 8,510,164 | B2 | 8/2013 | Newton et al. | |
| 9,330,085 | B2 | 5/2016 | Chakra et al. | |
| 9,552,442 | B2 * | 1/2017 | Hill ........................ | G06F 16/70 |
| 9,703,877 | B2 * | 7/2017 | Mawhinney ........ | G06F 16/9535 |

(Continued)

FOREIGN PATENT DOCUMENTS

WO  WO-2017160746 A1 *  9/2017  ............. G06F 40/30

OTHER PUBLICATIONS

Kariko et al., "Analysis on Internet Memes using Semiotics," Binus University, Jun. 2013, 16 pages.

*Primary Examiner* — Ario Etienne
*Assistant Examiner* — Sahera Halim
(74) *Attorney, Agent, or Firm* — Van Leeuwen & Van Leeuwen; Christopher M. Pignato

(57) ABSTRACT

An approach is provided in which a system receives a first meme sent from a first user that is targeted to a second user. The system transforms the first meme into a second meme based on analyzing the first meme against a first user profile data corresponding to the first user and a second user profile data corresponding to the second user. The transforming includes replacing at least one element of the first meme with a second element in the second meme. The system, in turn, sends the transformed second meme to the second user.

20 Claims, 9 Drawing Sheets

(56) References Cited

U.S. PATENT DOCUMENTS

| | | | |
|---|---|---|---|
| 9,720,894 B1* | 8/2017 | Pasko | G06F 40/169 |
| 2002/0103917 A1* | 8/2002 | Kay | H04L 51/04 |
| | | | 709/229 |
| 2008/0114737 A1* | 5/2008 | Neely | G06Q 10/107 |
| 2008/0288516 A1 | 11/2008 | Hadfield | |
| 2009/0222743 A1* | 9/2009 | Hadfield | H04L 12/1822 |
| | | | 715/753 |
| 2010/0063989 A1* | 3/2010 | Mehta | H04N 21/2343 |
| | | | 709/202 |
| 2011/0046939 A1* | 2/2011 | Balasaygun | G06F 9/543 |
| | | | 704/2 |
| 2011/0138413 A1* | 6/2011 | Hjelm | H04N 7/17318 |
| | | | 725/34 |
| 2012/0150957 A1* | 6/2012 | Bonchi | G06Q 50/01 |
| | | | 709/204 |
| 2012/0159315 A1* | 6/2012 | Chakra | G06F 40/258 |
| | | | 715/255 |
| 2013/0110494 A1* | 5/2013 | Elgazzar | G06F 40/40 |
| | | | 704/3 |
| 2014/0068661 A1* | 3/2014 | Gates, III | H04N 21/4532 |
| | | | 725/34 |
| 2015/0172242 A1* | 6/2015 | Goncalves | H04L 51/063 |
| | | | 709/206 |
| 2016/0042083 A1* | 2/2016 | Mawhinney | G06F 16/9535 |
| | | | 707/734 |
| 2016/0080476 A1 | 3/2016 | Sandell et al. | |
| 2016/0162455 A1* | 6/2016 | Chakra | G06F 17/2705 |
| | | | 715/255 |
| 2017/0017638 A1 | 1/2017 | Satyavarta et al. | |
| 2017/0201562 A1* | 7/2017 | Moon | H04L 67/306 |
| 2017/0308293 A1* | 10/2017 | Lee | G06F 3/04845 |
| 2018/0314409 A1* | 11/2018 | Adilipour | H04W 4/185 |
| 2018/0367835 A1* | 12/2018 | Hamidi-Rad | H04N 21/4126 |

* cited by examiner

MEME INTELLIGENT CONVERSION

BACKGROUND

A 'meme' is an idea, behavior, or style that spreads from person to person, often with the aim of conveying a particular phenomenon, theme, or meaning represented by the meme. The word meme is a shortening of "mimeme," which means "to imitate" or an "imitated thing." A meme acts as a unit for carrying cultural ideas, symbols, or practices, which can be transmitted from one mind to another through writing, speech, gestures, rituals, or other imitable phenomena with a mimicked theme. Some regard memes as cultural analogues to genes in that they self-replicate, mutate, and respond to selective pressures.

Today, with the development of the Internet and mobile devices, the majority of modern memes are captioned photos that virally transmit cultural symbols or social ideas across geographical boundaries. These modern memes are also referred to as "Internet memes" and are activities, concepts, catchphrases or piece of media that spreads, often as mimicry or for humorous purposes, from person to person via the Internet. Internet memes may cause small movements or fads that spread from person to person via social networks, blogs, direct email, or news sources.

BRIEF SUMMARY

According to one embodiment of the present disclosure, an approach is provided in which a system receives a first meme sent from a first user that is targeted to a second user. The system transforms the first meme into a second meme based on analyzing the first meme against a first user profile data corresponding to the first user and a second user profile data corresponding to the second user. The transforming includes replacing at least one element of the first meme with a second element in the second meme. The system, in turn, sends the transformed second meme to the second user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) receiving a first meme sent from a first user that is targeted to a second user; (ii) transforming the first meme to a second meme based on analyzing the first meme against a first user profile data corresponding to the first user and a second user profile data corresponding to the second user, wherein the transforming comprises replacing a first element in the first meme with a second element in the second meme; and (iii) sending the second meme to the second user.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
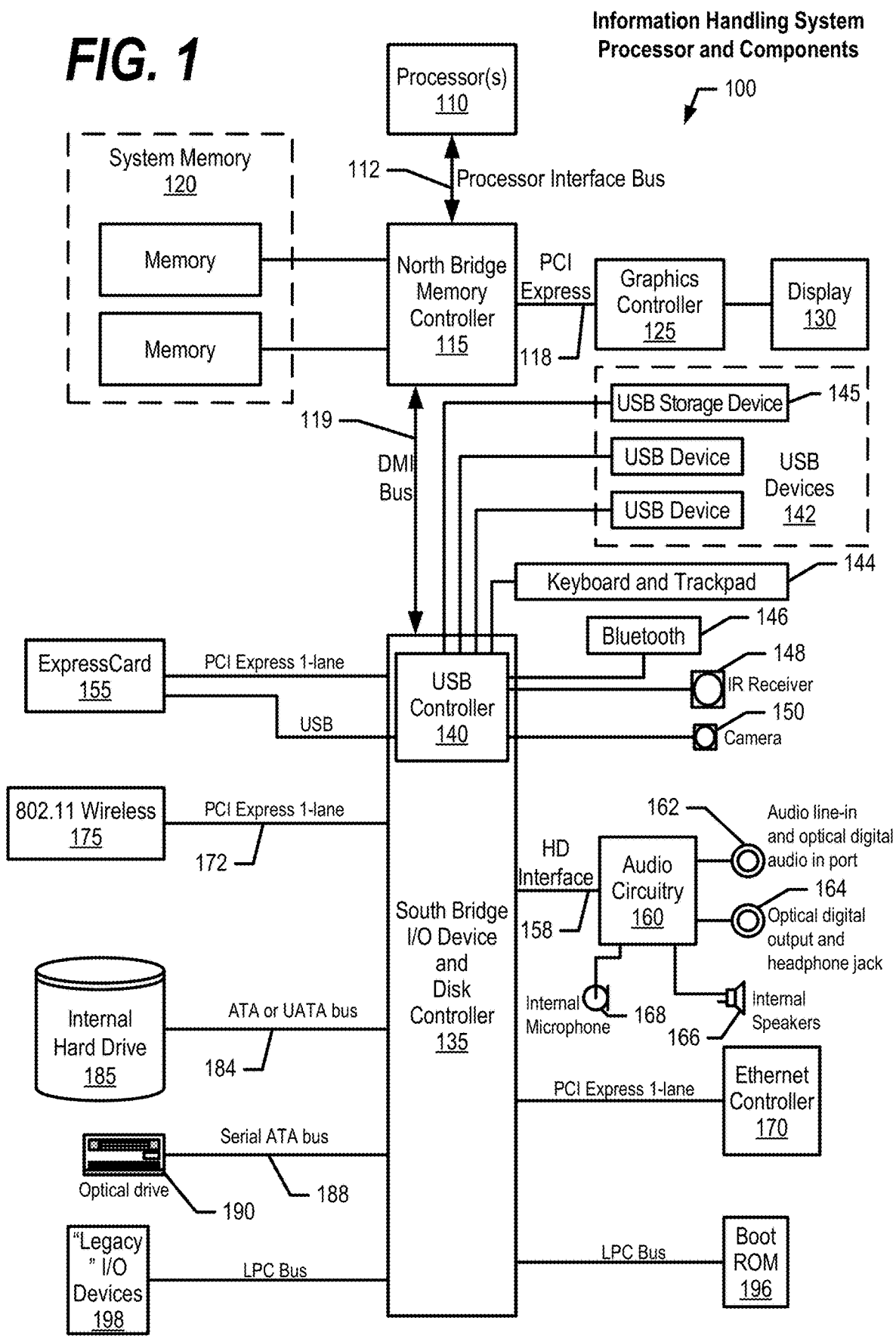
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
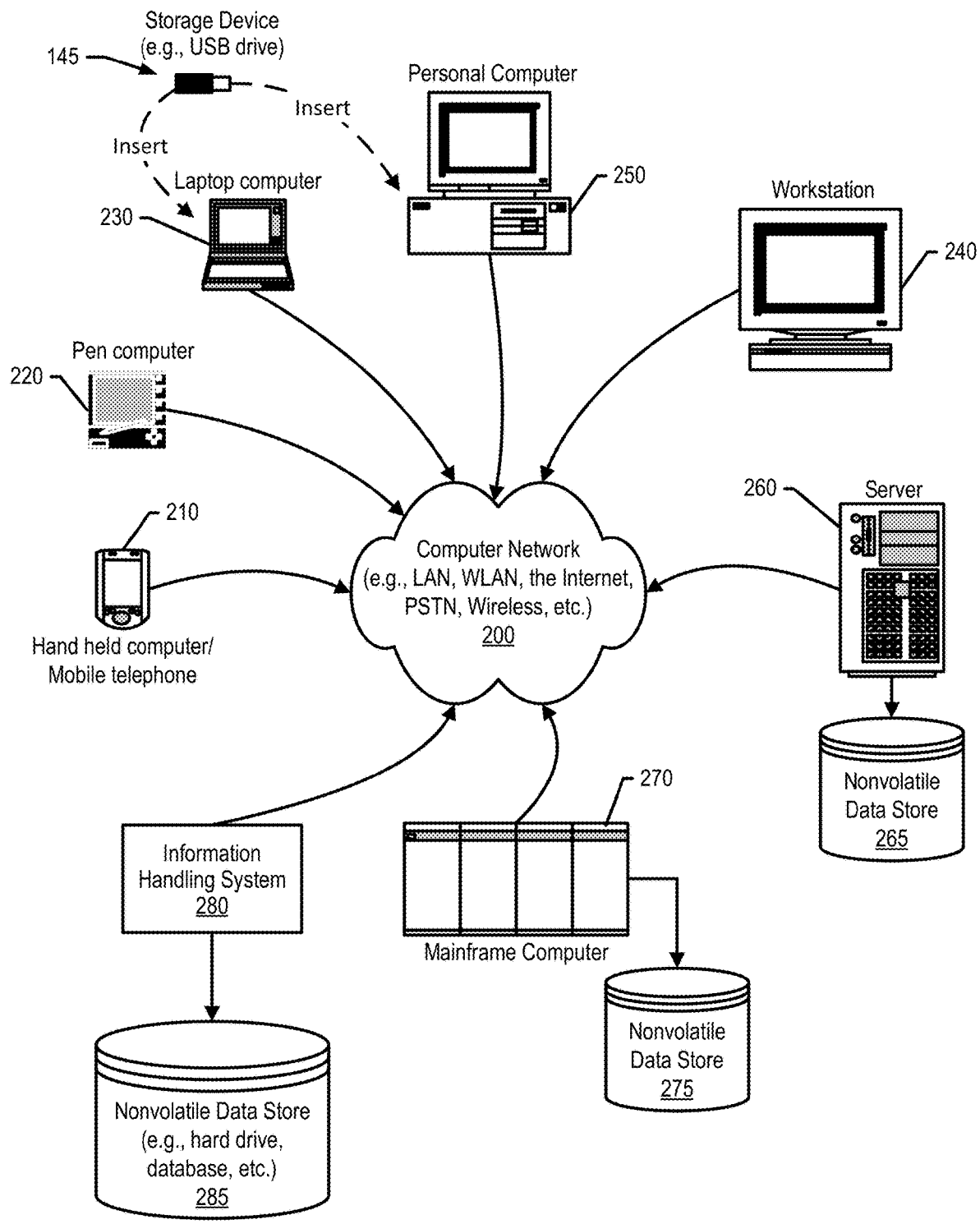
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system to intercept memes and transform the memes according to a recipient user's viewpoint. As discussed above, the majority of modern memes are captioned photos that virally transmit cultural symbols or social ideas. However, due to the fact that the memes are sent between geographical regions having cultural differences and different fundamental viewpoints, a recipient user may misinterpret the sending user's intended meaning of the meme. For example, a meme of "nod" means "Yes" in China but means "No" in India.

The approach discussed herein analyzes a meme against a sending user profile and recipient user profile to determine whether elements (e.g., image, text, etc.) in the meme require modification and/or descriptions need to be added before being sent to the recipient user. The information handling system analyzes both the meme's background image and foreground text to determine whether the recipient user will view the meme in the context that the sending user intended. When meme modifications are required, the information handling system replaces the image and/or text with a different image and/or text to convey the intended meaning of the sending user based on the recipient's viewpoint without offending the recipient user. In one embodiment, the information handling system also translates a meme's text to a different language, such as translating text from Spanish to English, and etcetera.

Figure 3:
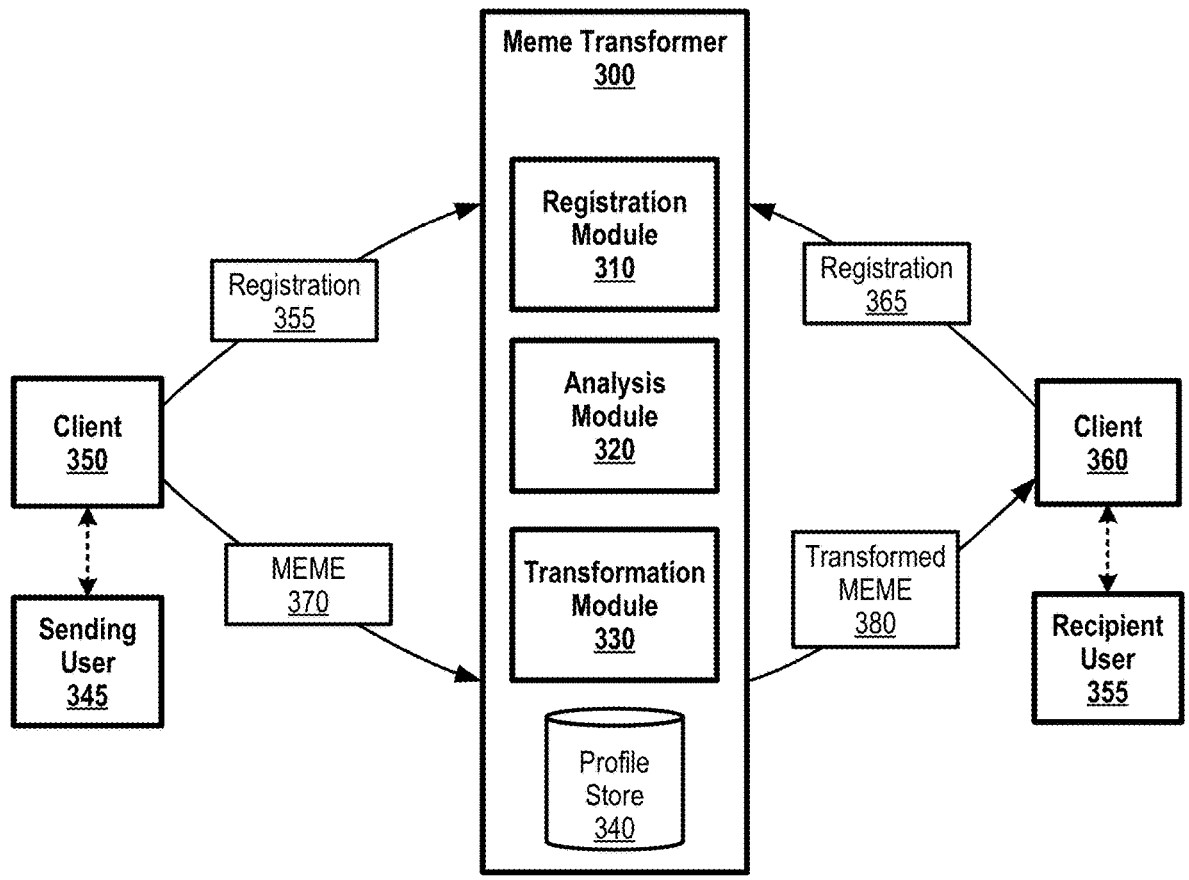
FIG. 3 is an exemplary diagram depicting a meme transformer that transforms memes based on a recipient's user's profile while maintaining the context intended by a sending user.

FIG. 3 is an exemplary diagram depicting a meme transformer that transforms memes based on a recipient's user's profile while maintaining the context intended by a sending user. Meme transformer 300 includes registration module 310, analysis module 320, and transformation module 330. Registration module 310 is responsible for registering users and storing their user profiles in profile store 340. Analysis module 320 is responsible for analyzing incoming memes and determining whether to transform particular meme elements because a recipient user may misinterpret the meme. And, transformation module 330 is responsible for transforming the meme so recipient user 355 interprets the meme in a context intended by sending user 345. Meme transformer 300 may include more or less modules than what is shown in FIG. 3.

Sending user 345 wishes to send a meme to recipient user 355. Prior to sending the meme (meme 370), sending user 345 uses client 350 to register with meme transformer 300 via registration 355. In one embodiment, meme transformer 300 provides a user interface to sending user 345 for sending user 345 to provide registration information (see FIG. 6 and corresponding text for further details). Registration module 310 receives registration 355, which includes user profile data, and stores the user profile data in profile store 340.

Likewise, recipient user 355 registers with meme transformer 300 using client 360. Recipient user 355 fills out user profile data and sends the user profile data to meme transformer 300 (registration 365). Meme transformer 300 then creates a user profile for recipient user 355 and stores the user profile data in profile store 340. In one embodiment, when a sending user sends a meme and the sending user and/or the recipient user do not yet have a user profile, meme transformer 300 prompts the sending user and/or recipient user to create a user profile so that meme transformer 300 may analyze and transform the meme correctly (see FIG. 7 and corresponding text for further details).

Once user profiles are established, sending user 345 uses client 350 to send meme 370 to recipient user 355. Meme transformer 300 intercepts meme 370 and analysis module 320 analyzes meme 370 by parsing meme 370 into elements (text, image, etc.) and analyzing the elements to identify each element's semantic meaning relative to sending user 345's user profile. For example, if the meme is a person nodding their head, the semantic meaning is 'Yes' if sending user 345's profile indicates sending user 345 is from China, but the semantic meaning is 'No' if sending user 345's profile indicates that sending user 345 is from India. Analysis module 320 also performs a mapping of the elements based on context (e.g., relationships), history (e.g., previous feedback), and rules (e.g., predetermined by system or user) (see FIG. 4 and corresponding text for further details).

Based on the analysis and mapping, analysis module 320 determines whether one or more of the elements in meme 370 require modification. If so, as discussed in detail below, transformation module 330 performs steps to transform the identified elements in meme 370 in a manner that enables recipient user 355 to interpret the meme in the context intended by sending user 345 without offending recipient user 355.

Transformation module 330 evaluates the identified elements requiring transformation against their intended meaning (from analysis module 320) and recipient user 355's user profile. Continuing with the example above, if sending user 345 is from China and recipient user 355 is from India, transformation module determines that the 'nodding' element needs to be substituted with a different image, or at least add an explanation to meme 370 describing the gesture. Transformation module 330 then 'transforms' meme 370 by replacing the identified elements with different elements (or adds a description) to create transformed meme 380 (see FIGS. 4, 8, 9, and corresponding text for further details). In turn, meme transformer 300 sends transformed meme 380 to recipient user 355 via client 360.

In some embodiments, sending user 345 may include new words in meme 370 that may be confusing to recipient user 355 if recipient user 355 has not yet been exposed to the new words. For example, recipient user 355 may not be familiar with a new word created by a news article or event seen by sending user 345 if recipient user 355 is unaware of the news article or event. To resolve this challenge, meme transformer 300, maintains or accesses a real-time dictionary of new words and their meanings, and transforms a new word according to recipient user 355's profile.

In some embodiments, recipient user 355 may be offended by a meme due to differences in upbringing, nationality, political affiliation, etc. between sending user 345 and recipient user 355. Meme transformer 300 allows a user to add personal preferences to the user's profile (e.g., via feedback mechanism), such as prohibiting images of certain animals that may be considered sacred to the user.

In some embodiments, client 350 and client 360 may have remote modules installed that communicate with meme transformer 300 to analyze and transform memes. For example, a remote module installed on client 350 may intercept meme 350 and send the meme to meme transformer 300 to evaluate. Meme transformer 300, in turn, sends transformed meme 380 back to the remote module on client 350, which the remote module forwards to client 360.

Figure 4:
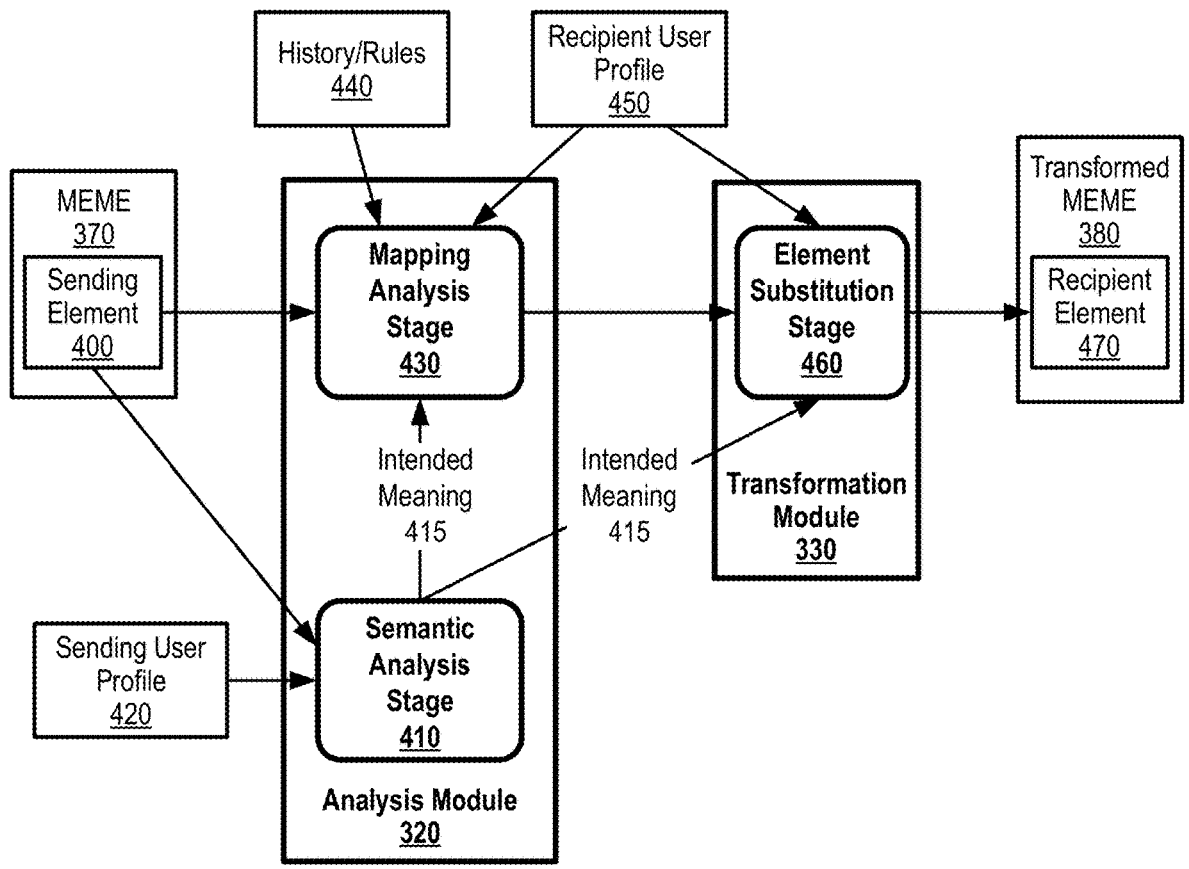
FIG. 4 is an exemplary diagram depicting a meme transformer's various stages to transform a meme element.

FIG. 4 is an exemplary diagram depicting stages to transform meme 370. Meme 370 includes sending element 400, which may be part of foreground text or part of a background image. Analysis module 320 performs semantic analysis stage 410 on sending element 400 using sending user profile 420. Semantic analysis stage 410 determines the intended meaning of sending element 400 based on user profile data in sending user profile 420, such as the meaning of a gesture, the meaning of a word in a particular language, etc. In turn, semantic analysis stage 410 passes the intended meaning of the element (intended meaning 415) to mapping analysis stage 430 and element substitution stage 460 if required (discussed below).

Mapping analysis stage 430 performs a mapping of sending element 400 based on its intended meaning 415, history/rules 440, and user profile data in recipient user profile 450. Recipient user profile 450 includes user profile information and may also include relationship information between sending user 345 and recipient user 355 that was obtained from, for example, searching one of the user's social media contact lists (the sending user or recipient user) during the registration process (see FIGS. 4, 5, and corresponding text for further details). History/rules 440 may include the history of previous feedback from recipient user 355 (e.g., no images of animals), and may also include predefined rules by a system (e.g., language translations) or user (e.g., no profanity). In turn, mapping analysis stage determines whether sending element 400 requires transformation and instructs transformation module 330 accordingly.

Element substitution stage 460 evaluates intended meaning 415 and recipient user profile 450, and identifies suitable elements that could be substituted in place of sending element 400, such as replacing a 'yes' nod with a 'no' nod, replacing an animal with a human, replacing improper language with proper language, and etcetera. Element substitution stage 450 also determines the relationship between sending user 345 and recipient user 355 based on recipient user profile 450 and, in some embodiments, sending user profile 420. In turn, element substitution stage 460 replaces sending element 400 with recipient element 470 to create transformed meme 380, which is then sent to recipient user 355 (see FIG. 9 and corresponding text for further details).

Figure 5:
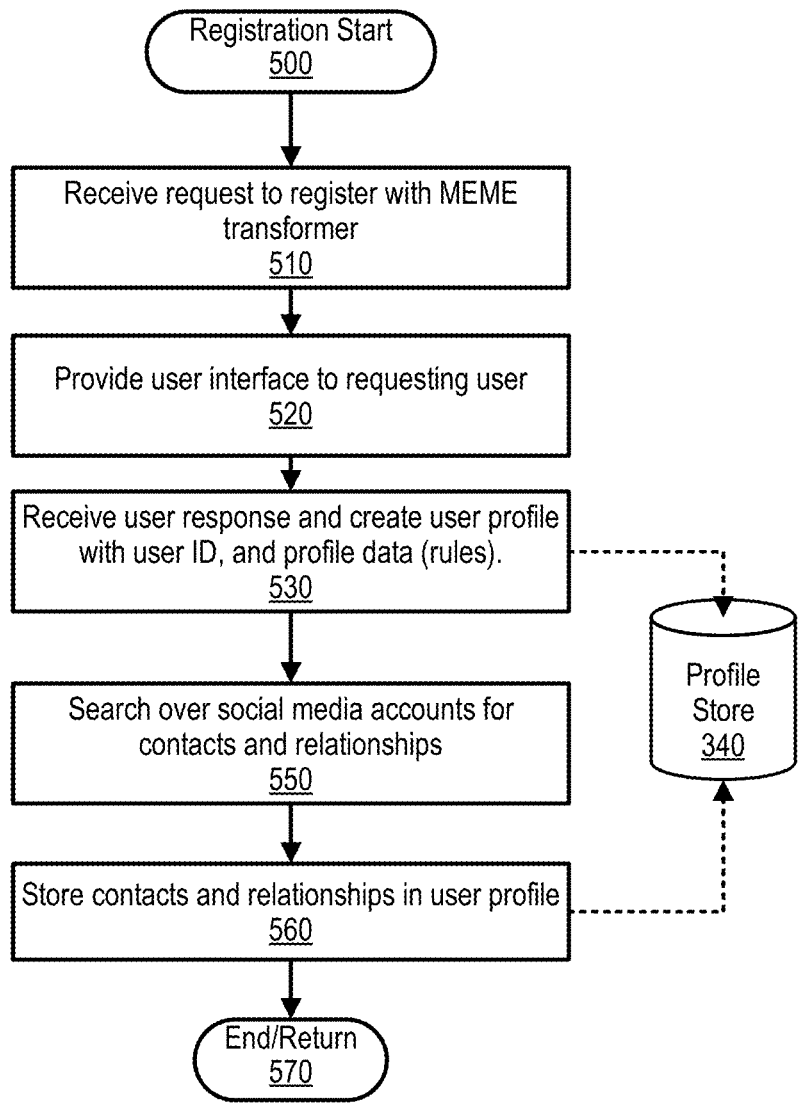
FIG. 5 is an exemplary flowchart showing steps taken to register a user with a meme transformer.

FIG. 5 is an exemplary flowchart showing steps taken to register a user with meme transformer 300. A user may "pre-register" with meme transformer 300, or the user may be prompted to register with meme transformer 300 when the user wishes to send a meme or is the intended recipient of the meme (see FIG. 7 and corresponding text for further details). In either case, meme transformer 300 proceeds through steps similar to those shown in FIG. 5.

FIG. 5 processing commences at 500 whereupon, at step 510, the process receives a request from a user (e.g., sending user 345) to register with meme transformer 300. At step 520, in one embodiment, the process provides a user interface to the requesting user, such as user interface 600 shown in FIG. 6. At step 530, the process receives user profile data and creates a user profile with a user ID and the received user profile data, which the process stores in profile store 340.

At step 550, in one embodiment, the process searches over the requesting user's social media accounts to identify the user's contacts and relationships, which may subsequently be used during meme evaluation and transformation. For example, a meme's transformation may be different if the sending user is a co-worker of the recipient user compared to if the sending user is a close friend or relative of the recipient user. At step 560, the process stores the contacts and relationships in the user profile in profile store 340. FIG. 5 processing thereafter ends or returns to the calling routine (see FIG. 7) at 570.

Figure 6:
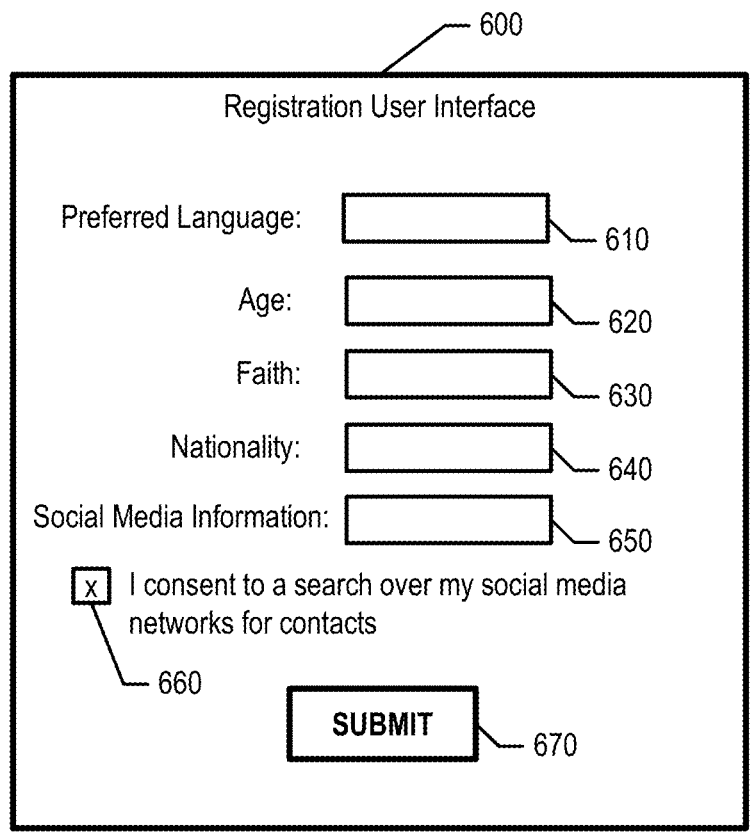
FIG. 6 is an exemplary diagram depicting a user interface provided by a meme transformer to register a user.

FIG. 6 is an exemplary diagram depicting a user interface to register a user. Meme transformer 300 provides user interface 600 to a user that is requesting to be registered. User interface 600 includes selection/entry boxes 610, 620, 630, 640, and 650 where the user enters pertinent information for meme transformer 300 to understand the user's viewpoints and context. In one embodiment, meme transformer 300 analyzes other users with similar profiles to determine their likes, dislikes, offensive elements, etc. Registration user interface 600 may include more, less, or different entries than what is shown in FIG. 6.

When the user is finished entering information, the user selects box 660 to give consent for meme transformer 300 to search the user's social media accounts for contacts, and selects submit button 670 to send the user profile information to meme transformer 300 to create a user profile.

Figure 7:
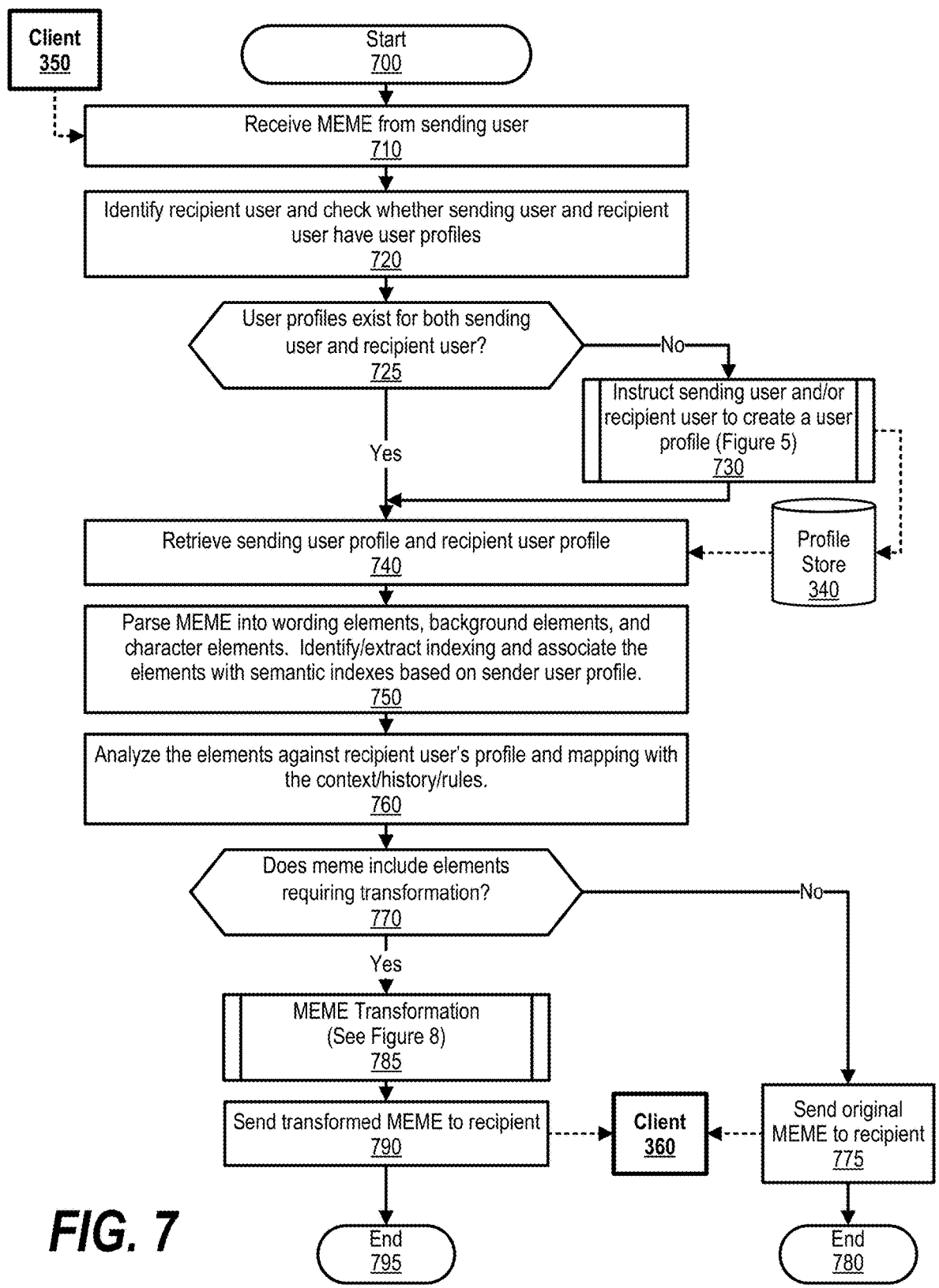
FIG. 7 is an exemplary flowchart showing steps taken to analyze an incoming meme, transform the meme, and send the transformed meme to a recipient user.

FIG. 7 is an exemplary flowchart showing steps taken to analyze an incoming meme, transform the meme, and send the transformed meme to a recipient user. FIG. 7 processing commences at 700 whereupon, at step 710, the process receives a meme from sending user 345 via client 350. At step 720, the process identifies the meme's recipient user as recipient user 355, and checks whether sending user 345 and recipient user 355 have registered and have user profiles.

The process determines as to whether user profiles exist for both sending user 345 and recipient user 355 (decision 725). If user profiles exist for both sending user and recipient user, then decision 725 branches to the 'yes' branch. On the other hand, if one or both of the users do not have a user profile, then decision 725 branches to the 'no' branch whereupon, at predefined process 730, the process sends a request to one or both of the users to register with meme transformer 300 (see FIG. 5 and corresponding text for processing details).

At step 740, the process retrieves sending user 345's user profile and recipient user 355's user profile from profile store 340. At step 750, the process parses the meme into elements, such as wording elements, background elements, and character elements, and identifies their semantic meaning based on sending user 345's user profile (see FIG. 4 and corresponding text for further details).

At step 760, the process analyzes the elements against the recipient user's profile and mapping with the context/history/rules (see FIG. 4 and corresponding text for further details). The process determines as to whether the meme includes elements requiring transformation that may be misinterpreted by recipient user 355 (e.g., improper or confusing) (decision 770) based on the analysis in step 760. In one embodiment, a threshold to trigger transformation is based on rules, which may dependent on the sending user/recipient user combination such as their relationship, feedback history, nationality, etc. For example, it may be not necessary to transform 'joking' elements if sending user 345 and recipient user 355 are friends. If the process determines that the meme does not include any elements requiring transformation, then decision 770 branches to the 'no' branch whereupon, at step 775, the process sends the original meme to recipient user 355 via client 360. FIG. 7 processing thereafter ends at 780.

On the other hand, if the process determines that one or more of the meme elements require transformation, then decision 770 branches to the 'yes' branch. At predefined process 785, the process transforms the meme elements based on the sending user's profile and recipient user's profile (see FIG. 8 and corresponding text for processing details). At step 790, the process sends the transformed meme to recipient user 355 via client 360, and FIG. 7 processing thereafter ends at 795.

Figure 8:
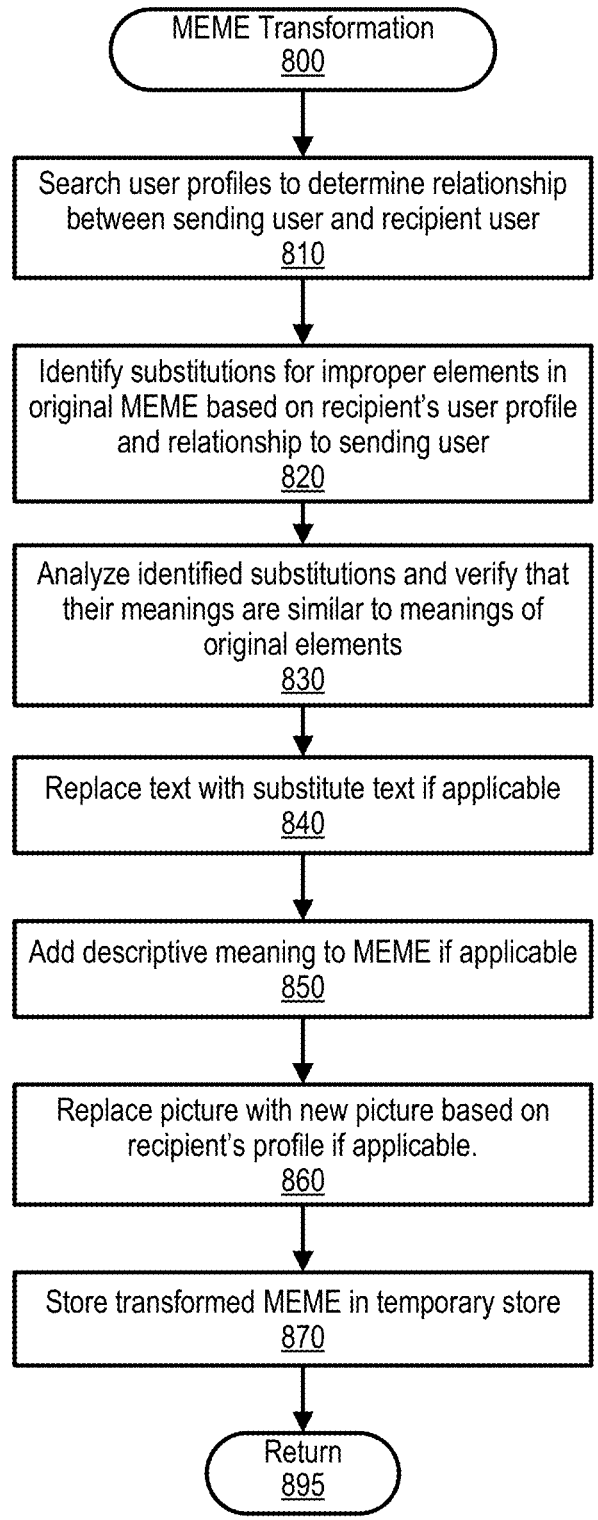
FIG. 8 is an exemplary flowchart showing steps taken to transform elements in a meme that may be misinterpreted by a recipient user.

FIG. 8 is an exemplary flowchart showing steps taken to transform elements in a meme that may be misinterpreted by, or be offensive to, a recipient user. FIG. 8 processing commences at 800 whereupon, at step 810, the process searches sending user 345's profile and recipient user 355's profile to determine the relationship of sending user 345 with recipient user 355. This relationship may factor in on the extent at which the elements will be transformed. At step 820, the process identifies substitutions for the identified elements in the original meme based on the elements intended meaning, recipient user's 355 profile, and user relationship information.

At step 830, the process analyzes the identified substitutions and verifies that their meanings are similar to the intended meanings of the original elements relative to recipient user 355 (happy, sad, etc.) At step 840, if applicable, the process replaces the original meme's text with substitute text (e.g., non-offensive, translated language, etc.) and, at step 850, the process adds a descriptive meaning to the meme if applicable to further describe the meme (see FIG. 9 and corresponding text for further details).

At step 860, if applicable, the process replaces the background image with a new image based on the recipient's profile. For example, the background image may be offensive to certain cultures and, as such, the process replaces the image with a less offensive image that has a similar context with the original meme (e.g., replace a dirty pig with a dirty cat). At step 870, the process stores the transformed meme in a temporary storage area, which is eventually sent to recipient user 355. FIG. 8 processing thereafter returns to the calling routine (see FIG. 7) at 895.

Figure 9:
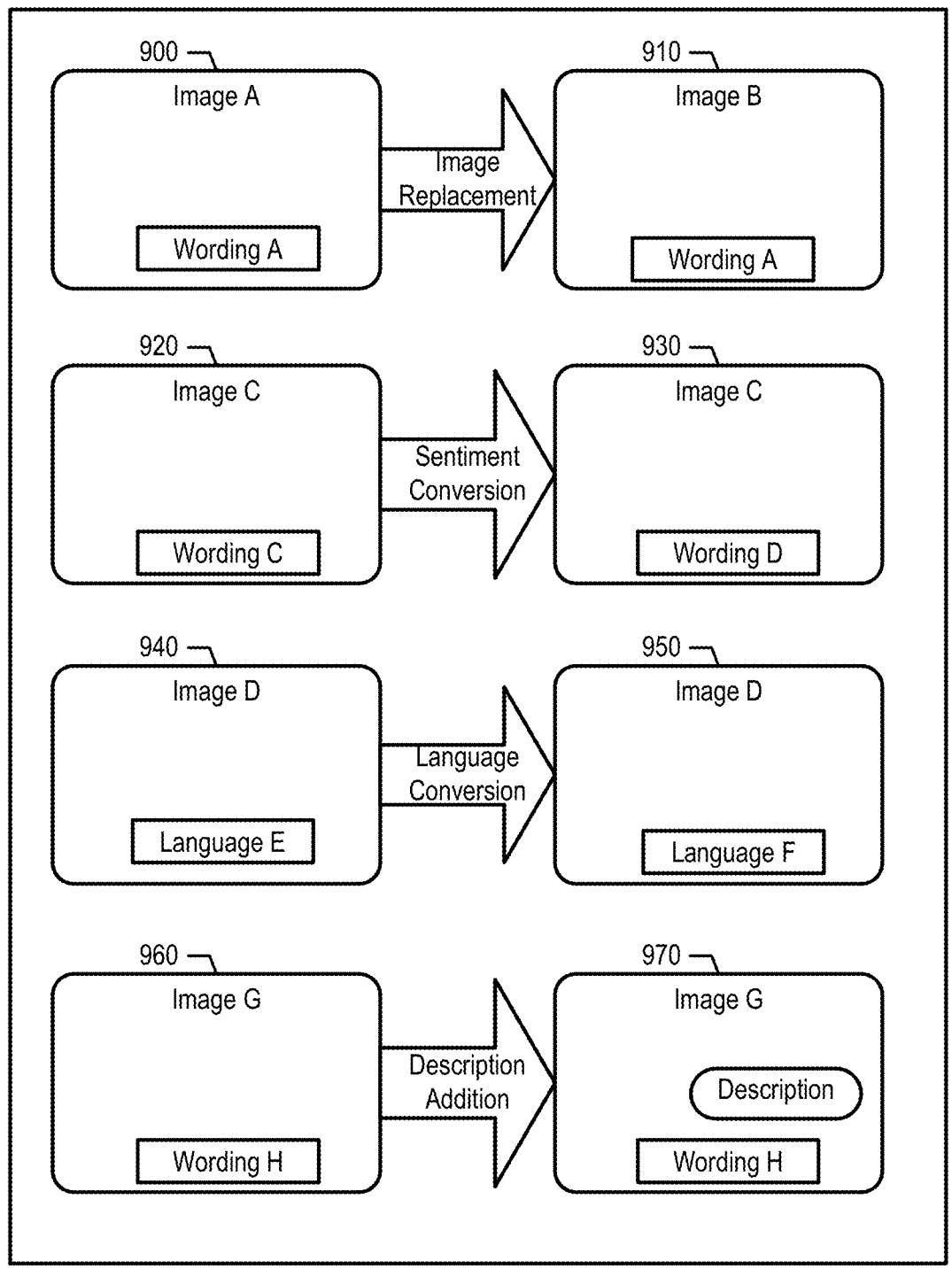
FIG. 9 is an exemplary diagram depicting various meme transformations.

FIG. 9 is an exemplary diagram depicting various meme transformations. As discussed herein, meme transformer 300 may transform various elements in a meme for various reasons, such as to replace an image, change its sentiment, translate a language, or add a description to the meme. When meme transformer 300 receives meme 900, which includes image A and wording A, meme transformer 300 determines that image A requires transforming due to, for example, that the recipient user may find image A offensive. As such, meme transformer 300 proceeds through steps discussed herein to replace image A with image B and send transformed meme 910 to the recipient user.

When meme transformer 300 receives meme 920, which includes image C and wording C, meme transformer 300 determines that wording C's sentiment requires transforming due to, for example, that the recipient user may find wording C offensive. As such, meme transformer 300 proceeds through steps discussed herein to replace wording C with wording D and send transformed meme 930 to the recipient user.

When meme transformer 300 receives meme 940, which includes image D and foreground text written in language E, meme transformer 300 determines that the foreground text requires translating for the recipient user to read. As such, meme transformer 300 proceeds through steps discussed herein to translate the foreground text from language E to language F and send transformed meme 950 to the recipient user.

When meme transformer 300 receives meme 960, which includes image G and wording H, meme transformer 300 determines that the meme requires further explanation so the recipient user understands. As such, meme transformer 300 proceeds through steps discussed herein to add a description to the meme and send transformed meme 970 to the recipient user.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving, at a meme transformer, a first meme that was transmitted by a first device with a second device as an intended target recipient, wherein the meme transformer is different from the second device;
   prior to the first meme being received by the second device, transforming, by the meme transformer, the first meme to a second meme based on a both a first user profile data and a second user profile data, wherein the first user profile data corresponds to a first user of the first device and the second user profile data corresponds to a second user of the second device, and wherein the transforming further comprises:
      parsing the first meme into a plurality of first elements;
      analyzing the plurality of first elements against both the first user profile data and the second user profile data;
      in response to the analyzing, identifying at least one of the plurality of first elements that requires transformation to a second element, wherein the second element is selected based upon the second user profile data; and
      transforming the first meme into the second meme by replacing the identified first element with the second element; and
   sending, by the meme transformer, the second meme to the second device utilized by the second user.

2. The method of claim 1 further comprising:
   determining a plurality of semantic meanings of the plurality of first elements based on the first user profile data; and
   identifying a plurality of second elements that correspond to the plurality of first elements based on the plurality of semantic meanings and the second user profile data, the second element included in the plurality of second elements.

3. The method of claim 2 further comprising:
   determining that the identified first element is offensive to the second user based on the second user profile data; and
   replacing the identified first element with the second element in response to determining that the identified first element is offensive to the second user based on the second user profile data.

4. The method of claim 1 wherein the identified first element is a first background image, the method further comprising:
   analyzing an intended meaning of the first background image for which the first user intends to convey based on the first user profile data;
   identifying a second background image that corresponds to the intended meaning based on the second user profile data; and
   selecting the identified second background image as the second element to replace the first background image.

5. The method of claim 1 wherein, prior to the transforming, the method further comprises:
   receiving the first user profile data from the first user;
   creating a first user profile from the first user profile data;
   in response to the receiving of the first meme, determining that the second user profile data does not exist;

sending a request to the second user to create the second user profile;
receiving the second user profile data from the second user in response to sending the request; and
creating the second user profile using the second user profile data.

6. The method of claim 5 further comprising:
identifying one or more social media accounts in the second user profile data of the second user;
determining a relationship between the second user and the first user in response to searching the one or more social media accounts; and
determining whether to transform the first meme to the second meme based on the determined relationship.

7. The method of claim 1 wherein the first user profile data comprises a first set of rules configured by the first user, and wherein the second user profile data comprises a second set of rules configured by the second user.

8. An information handling system comprising:
one or more processors;
a memory coupled to at least one of the processors;
a set of computer program instructions stored in the memory and executed by at least one of the processors in order to perform actions of:
receiving, at a meme transformer, a first meme that was transmitted by a first device with a second device as an intended target recipient, wherein the meme transformer is different from the second device;
prior to the first meme being received by the second device, transforming, by the meme transformer, the first meme to a second meme based on a both a first user profile data and a second user profile data, wherein the first user profile data corresponds to a first user of the first device and the second user profile data corresponds to a second user of the second device, and wherein the transforming further comprises:
parsing the first meme into a plurality of first elements;
analyzing the plurality of first elements against both the first user profile data and the second user profile data;
in response to the analyzing, identifying at least one of the plurality of first elements that requires transformation to a second element, wherein the second element is selected based upon the second user profile data; and
transforming the first meme into the second meme by replacing the identified first element with the second element; and
sending, by the meme transformer, the second meme to the second device utilized by the second user.

9. The information handling system of claim 8 wherein the processors perform additional actions comprising:
determining a plurality of semantic meanings of the plurality of first elements based on the first user profile data; and
identifying a plurality of second elements that correspond to the plurality of first elements based on the plurality of semantic meanings and the second user profile data, the second element included in the plurality of second elements.

10. The information handling system of claim 9 wherein the processors perform additional actions comprising:
determining that the identified first element is offensive to the second user based on the second user profile data; and
replacing the identified first element with the second element in response to determining that the identified first element is offensive to the second user based on the second user profile data.

11. The information handling system of claim 8 wherein the identified first element is a first background image, and wherein the processors perform additional actions comprising:
analyzing an intended meaning of the first background image for which the first user intends to convey based on the first user profile data
identifying a second background image that corresponds to the intended meaning based on the second user profile data; and
selecting the identified second background image as the second element to replace the first background image.

12. The information handling system of claim 8 wherein, prior to the transforming, the processors perform additional actions comprising:
receiving the first user profile data from the first user;
creating a first user profile from the first user profile data;
in response to the receiving of the first meme, determining that the second user profile data does not exist;
sending a request to the second user to create the second user profile;
receiving the second user profile data from the second user in response to sending the request; and
creating the second user profile using the second user profile data.

13. The information handling system of claim 12 wherein the processors perform additional actions comprising:
identifying one or more social media accounts in the second user profile data of the second user;
determining a relationship between the second user and the first user in response to searching the one or more social media accounts; and
determining whether to transform the first meme to the second meme based on the determined relationship.

14. The information handling system of claim 8 wherein the first user profile data comprises a first set of rules configured by the first user, and wherein the second user profile data comprises a second set of rules configured by the second user.

15. A computer program product stored in a computer readable storage medium, comprising computer program code that, when executed by an information handling system, causes the information handling system to perform actions comprising:
receiving, at a meme transformer, a first meme that was transmitted by a first device with a second device as an intended target recipient, wherein the meme transformer is different from the second device;
prior to the first meme being received by the second device, transforming, by the meme transformer, the first meme to a second meme based on a both a first user profile data and a second user profile data, wherein the first user profile data corresponds to a first user of the first device and the second user profile data corresponds to a second user of the second device, and wherein the transforming further comprises:
parsing the first meme into a plurality of first elements;
analyzing the plurality of first elements against both the first user profile data and the second user profile data;
in response to the analyzing, identifying at least one of the plurality of first elements that requires transformation to a second element, wherein the second element is selected based upon the second user profile data; and transforming the first meme into the second meme by replacing the identified first element with the second element; and sending, by the meme transformer, the second meme to the second device utilized by the second user.

16. The computer program product of claim 15 wherein the information handling system performs further actions comprising:

determining a plurality of semantic meanings of the plurality of first elements based on the first user profile data; and identifying a plurality of second elements that correspond to the plurality of first elements based on the plurality of semantic meanings and the second user profile data, the second element included in the plurality of second elements.

17. The computer program product of claim 16 wherein the information handling system performs further actions comprising:

determining that the identified first element is offensive to the second user based on the second user profile data; and replacing the identified first element with the second element in response to determining that the identified first element is offensive to the second user based on the second user profile data.

18. The computer program product of claim 15 wherein the identified first element is a first background image, and wherein the information handling system performs further actions comprising:

analyzing an intended meaning of the first background image for which the first user intends to convey based on the first user profile data identifying a second background image that corresponds to the intended meaning based on the second user profile data; and selecting the identified second background image as the second element to replace the first background image.

19. The computer program product of claim 15 wherein, prior to the transforming, the information handling system performs further actions comprising:

receiving the first user profile data from the first user;

creating a first user profile from the first user profile data;

in response to the receiving of the first meme, determining that the second user profile data does not exist;

sending a request to the second user to create the second user profile;

receiving the second user profile data from the second user in response to sending the request; and creating the second user profile using the second user profile data.

20. The computer program product of claim 19 wherein the information handling system performs further actions comprising:

identifying one or more social media accounts in the second user profile data of the second user;

determining a relationship between the second user and the first user in response to searching the one or more social media accounts; and determining whether to transform the first meme to the second meme based on the determined relationship.

* * * * *